United States Patent [19]

Hitosugi

[11] Patent Number: 5,013,217
[45] Date of Patent: May 7, 1991

[54] COMPRESSING APPARATUS WITH EXTENDED VARIABLE CAPACITY RANGE AND CAPACITY CONTROL METHOD THEREOF

[75] Inventor: Toshiaki Hitosugi, Numazu, Japan

[73] Assignee: Kabushiki Kaisha Toshiba, Kawasaki, Japan

[21] Appl. No.: 501,317

[22] Filed: Mar. 27, 1990

Related U.S. Application Data

[63] Continuation of Ser. No. 294,791, Jan. 9, 1989, abandoned.

[30] Foreign Application Priority Data

Jan. 29, 1988 [JP] Japan .................. 63-018917

[51] Int. Cl.⁵ .................. F04B 49/00
[52] U.S. Cl. .................. 417/26; 417/53; 417/45
[58] Field of Search .................. 417/26, 42, 410, 288, 417/245, 45, 53

[56] References Cited

U.S. PATENT DOCUMENTS

| | | |
|---|---|---|
| 4,137,726 | 2/1979 | Watada . |
| 4,407,139 | 10/1983 | Ide et al. .................. 62/228.4 |
| 4,452,570 | 6/1984 | Fujisaki et al. .................. 417/295 |
| 4,780,067 | 10/1988 | Suzuki et al. .................. 417/410 |

FOREIGN PATENT DOCUMENTS

| | | |
|---|---|---|
| 0087770 | 9/1983 | European Pat. Off. . |
| 0147511 | 11/1979 | Japan .................. 417/410 |
| 56-4877 | 2/1981 | Japan . |
| 56-12085 | 2/1981 | Japan . |
| 0059081 | 4/1982 | Japan .................. 417/53 |
| 0059083 | 4/1982 | Japan .................. 417/53 |
| 472488 | 9/1937 | United Kingdom . |
| 757213 | 9/1956 | United Kingdom . |
| 1171707 | 11/1969 | United Kingdom . |
| 1429050 | 3/1976 | United Kingdom . |
| 1429084 | 3/1976 | United Kingdom . |
| 2049814 | 12/1980 | United Kingdom . |

Primary Examiner—Leonard E. Smith
Assistant Examiner—David W. Scheuermann
Attorney, Agent, or Firm—Cushman, Darby & Cushman

[57] ABSTRACT

A rotary compressor includes first and second compressing devices in a casing to successively carry out a parallel operation wherein first and second compressing devices are parallely driven and a single operation wherein one of first and second compressing devices is driven. A relatively high driving frequency is applied to the rotary compressor during single operation as compared to the driving frequency during parallel operation necessary to produce the same compressing capacity to enhance the EER of the rotary compressor and to extend the variable compressing capacity of the rotary compressor.

6 Claims, 4 Drawing Sheets

COMPRESSING APPARATUS WITH EXTENDED VARIABLE CAPACITY RANGE AND CAPACITY CONTROL METHOD THEREOF

This is a continuation-in-part of application Ser. No. 7,294,791, filed Jan. 9, 1989, which was abandoned upon the filing hereof.

BACKGROUND OF THE INVENTION

1. Field of the Invention

This invention relates, in general, to compressing apparatus for compressing fluid, e.g., refrigerant, flowing through a refrigerating circuit. In particular, the invention relates to a rotary compressor for varying a compressing capacity thereof in response to load.

2. Description of the Related Art

A well known refrigerating circuit, e.g., an air conditioning circuit, is shown in FIG. 1. In FIG. 1, internal and external fan devices, accumulator, etc., which are conventionally used in a such circuit, are not shown for simplicity. A refrigerating circuit 11 includes a rotary compressor 13, a four-way valve 15, an external heat-exchanger 17, a decompressing device 19, e.g., capillary tube, and an internal heat-exchanger 21 connected in series. Refrigerating circuit 11 performs either a heating or cooling operation in response to the change in direction of fluid flow controlled by four-way valve 15. As is well known, rotary compressor 13 has a variable compressing ability responding to an air conditioning load. In such a rotary compressor, a driving unit 23 and a rotary compressing unit 25 are disposed in a hermetic casing 27. Rotary compressing unit 25 is driven by driving unit 23. The output frequency of an inverter circuit 29 is fed to driving unit 23, as a driving frequency. Thus, the compressing capacity of rotary compressing unit 25 can change in response to changes in the output frequency of inverter circuit 29 through driving unit 23, as indicated by a line A in FIG. 2.

However, in the above-described refrigerating circuit 11, rotary compressor 13, which changes a compressing capacity thereof in response to the output frequency of inverter circuit 29, has a lower limit compressing capacity corresponding to a prescribed output frequency, e.g., 30 Hz, of inverter circuit 29. This is because mechanical vibrations of rotary compressor 13 increase if the output frequency of inverter circuit 29 decreases below 30 Hz. Therefore, the compressing capacity of rotary compressor 13 can not be decreased beyond the lower limit compressing capacity thereof. Furthermore, decreasing the output frequency of inverter circuit 29 applied to rotary compressor 13 creates another problem. As shown in FIG. 2, the energy efficiency ratio (hereinafter referred as EER) of rotary compressor 13 is greatly reduced, as indicated by a curved line B, when the output frequency of inverter circuit 29 decreases. In particular, this phenomenon is caused by a decrease in the efficiency of driving unit 23 of compressor 13. Thus, the EER of rotary compressor 13 is not enhanced although the compressing capacity of rotary compressor 13 can be varied by inverter circuit 29.

SUMMARY OF THE INVENTION

It is an object of the present invention to expand the compressing capacity of a compressing apparatus toward a lower driving frequency.

It is another object of the invention to enhance the EER of a variable capacity compressing apparatus.

It is still another object of the invention to provide a method for increasing the range of a compressing capacity of a compressing apparatus at the lower end.

To accomplish the above-described objects, a compressing apparatus includes a first compressing device and a second compressing device, a variably driving device for driving the first and second compressing devices, and a selecting device for selecting either a parallel operation state wherein both the first and second compressing devices are compressing and a single operation state wherein either the first or the second compressing devices is compressing. The selecting device may include a valve for interrupting a gaseous fluid flowing into either the first or second compressing device to cause a change from the parallel operation state to the single operation state. The driving device may include a variable rotation motor and an inverter circuit which varies the driving frequency supplied to the motor. The driving frequency supplied from the inverter circuit to the motor may be increased to a value higher than a minimum driving frequency for enhancing the energy efficiency ratio of the compressing apparatus when the operation of the first and second compressing devices is changed from the parallel operation state to the single operation state. The parallel operation state and the single operation state may be sequentially performed for successively varying a compressing capacity of the compressing apparatus.

BRIEF DESCRIPTION OF THE ACCOMPANYING DRAWINGS

Other features and advantages of the present invention will be apparent from the following description taken in connection with the accompanying drawings wherein.

Figure 3:
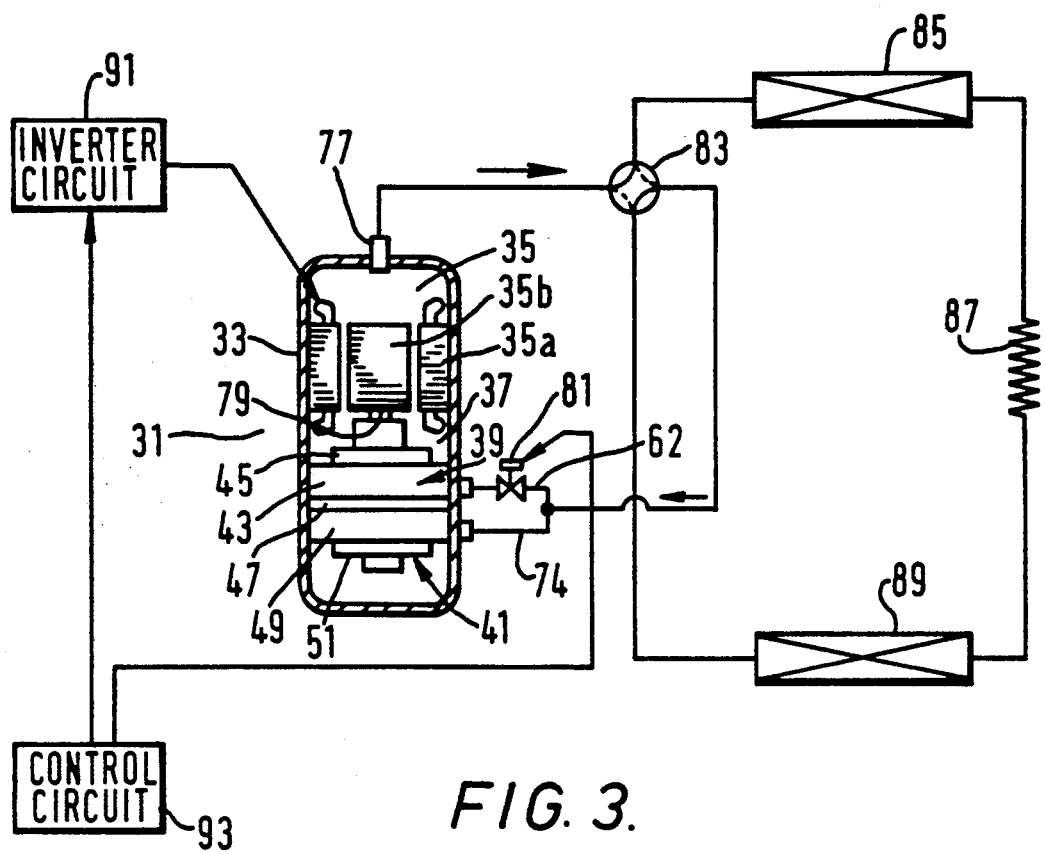
FIG. 3 is a schematic view illustrating a refrigerating circuit of an air conditioning apparatus of one embodiment of the present invention.
Figure 4:
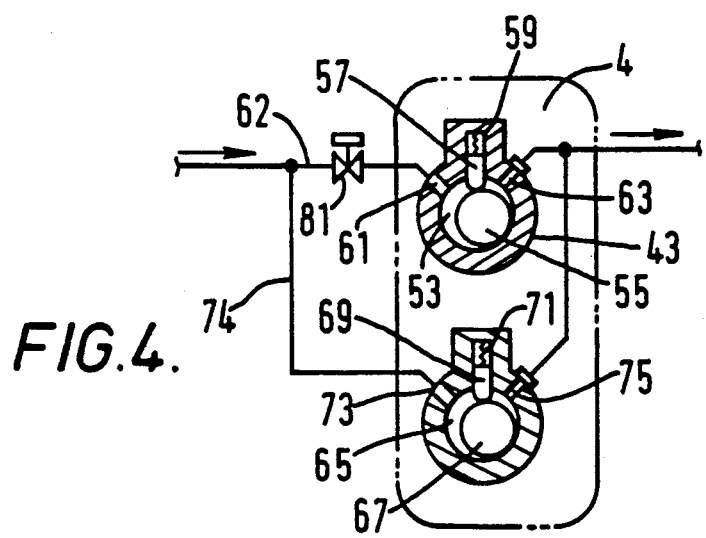
FIG. 4 is a diagramatical sectional view illustrating the operation of first and second rotary compressing devices of the rotary compressor of one embodiment shown in FIG. 3.
Figure 5:
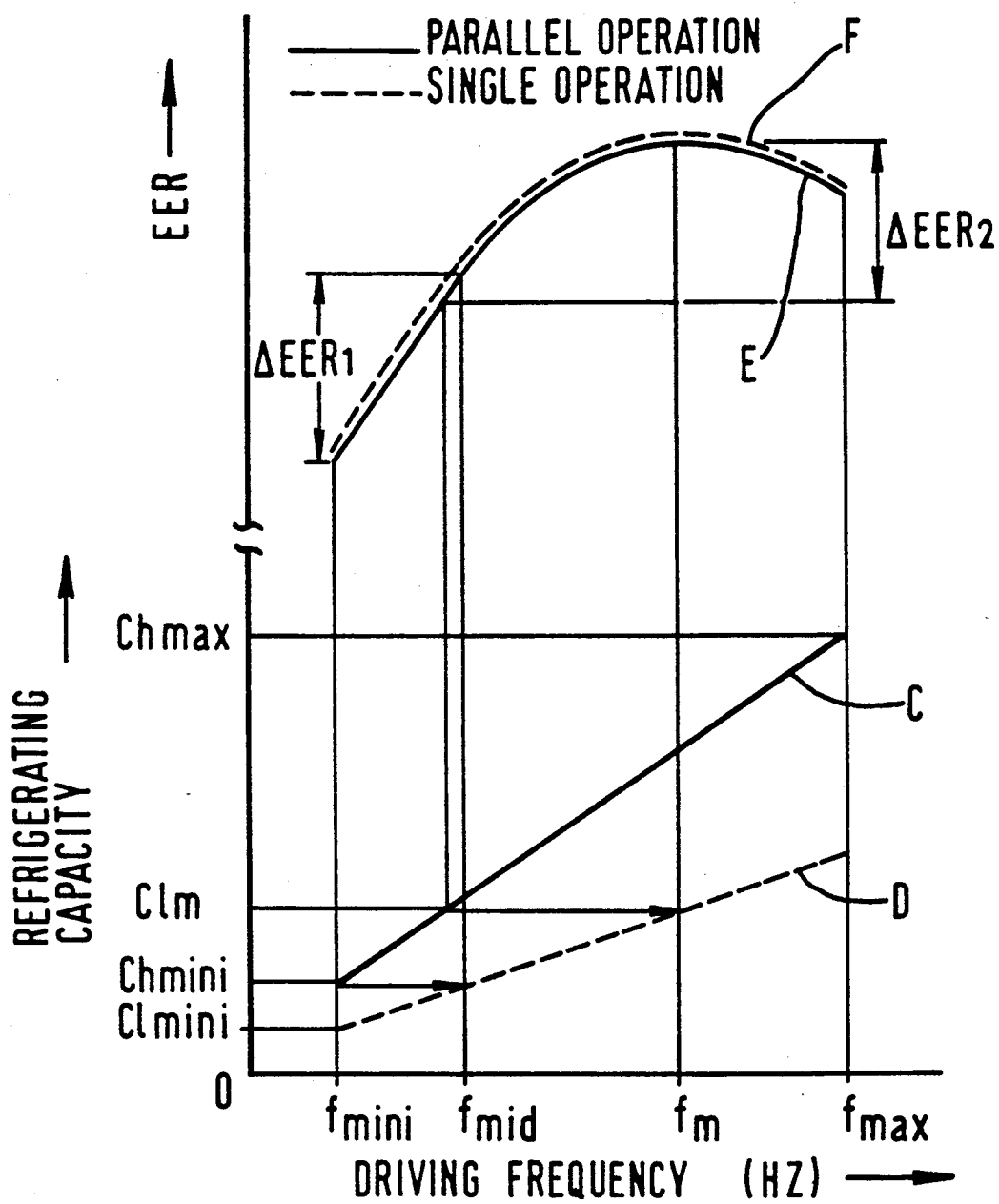
Figure 6:
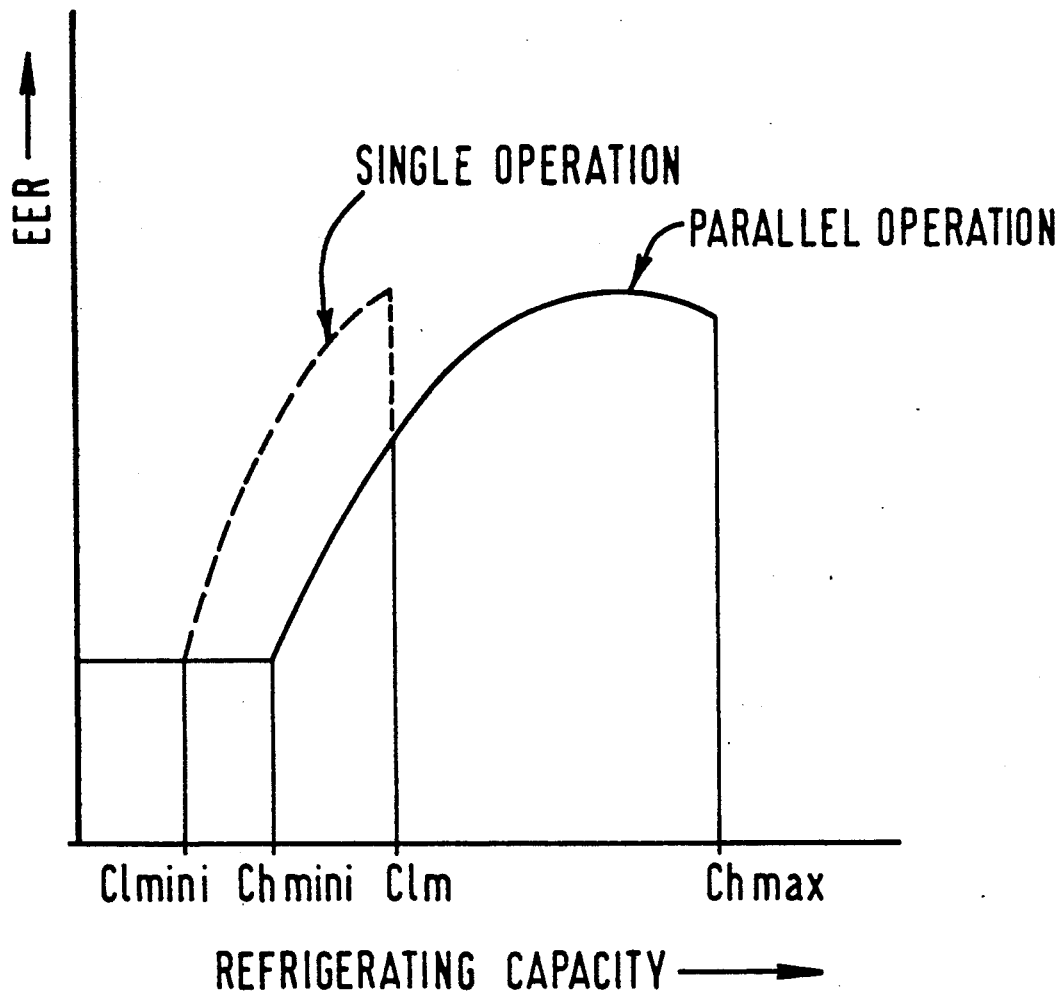

FIG. 5 is a graph illustrating changes of EER and the compressing capacity of the rotary compressor of one embodiment shown in FIGS. 3 and 4 when the driving frequency fed to the rotary compressor varies; and FIG. 6 is a graph illustrating a transition of each EER of the rotary compressor when the refrigerating capacity of the compressor is changed to the parallel operation or the single operation in one embodiment.

DETAILED DESCRIPTION OF THE PREFERRED EMBODIMENTS

Preferred embodiments of the present invention will now be described in more detail with reference to the accompanying drawings. The present invention is applied to an air conditioning apparatus, as shown in FIG. 3.

A rotary compressor 31 includes a hermetic casing 33 wherein a driving unit 35 is disposed at an upper portion of casing 33, and a rotary compressing unit 37 is disposed at a lower portion of casing 33. Driving unit 35 is composed of a stator 35a and a rotor 35b. Rotary compressing unit 37 includes a first rotary compressing device 39 and a second rotary compressing device 41 mechanically connected in series. A first cylinder 43 of first rotary compressing device 39 is airtightly sandwiched between a main bearing 45 and a partition plate 47. A second cylinder 49 of second rotary compressing device 41 is also sandwiched between partition plate 47 and a sub-bearing 51 in an airtight state. Therefore, first rotary compressing device 39 is mounted on second rotary compressing device 41. As shown in FIGS. 3 and 4, a compressing chamber 53 of first rotary compressing device 39 is defined by main bearing 45, first cylinder 43, and partition plate 47. An eccentrically rotating roller 55 is disposed in compressing chamber 53. A reciprocating blade 57 contacts the side surface of roller 55 for partitioning compressing chamber 53 into two fluid cells. Reciprocating blade 57 is urged toward roller 55, and moves along a guide groove 59 formed in cylinder 43 in response to the eccentric rotation of roller 55. A first intake port 61 is formed in cylinder 43 adjacent to guide groove 59. A first suction pipe 62 is inserted into intake port 61 and projects from casing 33, as shown in FIG. 3. A first output port 63 also is formed in cylinder 43 adjacent to first intake port 61 through guide groove 59. The construction of second rotary compressing device 41 is similar to that of first rotary compressing device 39 described above.

A compressing chamber 65 of second rotary compressing device 41 is defined by partition plate 47, second cylinder 49, and sub-bearing 51. An eccentrically rotating roller 67 is disposed in compressing chamber 65. A reciprocating blade 69 contacts the side surface of roller 67, and moves along a guide groove 71. A second intake port 73 is formed in second cylinder 49. A second suction pipe 74 is inserted into second intake port 73, and projects from casing 33, as shown in FIG. 3. A second output port 75 is formed in second cylinder 49 adjacent to second intake port 73 through guide groove 71. Each output port 63, 75 of first and second rotary compressing devices 39 and 41 is exposed to the interior of casing 33, and is in fluid communication with an output pipe 77 airtightly inserted into the upper surface of casing 33, as shown in FIG. 3. First and second rollers 55 and 67 of first and second rotary compressing devices 39 and 41 are mechanically connected in series with rotor 35b of driving unit 35 through a shaft 79. Thus, first and second rotary compressing devices 39 and 41 are simultaneously driven by driving unit 35.

An open/close valve 81, e.g., an electromagnetic two-way valve, is arranged in first suction pipe 62 to interrupt gaseous fluid flowing into first cylinder 43 of first rotary compressing device 39. Therefore, open/close valve 81 causes compressor 31 to change from a single operation wherein only the second rotary compressing device 41 operates to a parallel operation wherein both the first and second rotary compressing devices 39 and 41 operate, and vice versa.

Figure 1:
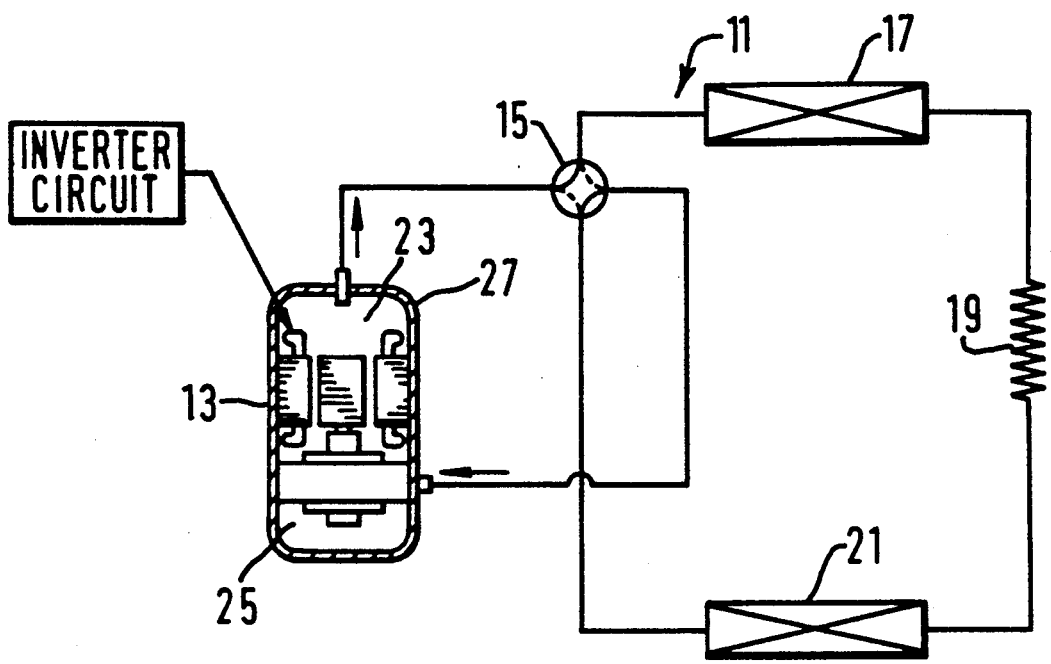
FIG. 1 is a schematic view illustrating a conventional refrigerating circuit of an air conditioning apparatus.
Figure 2:
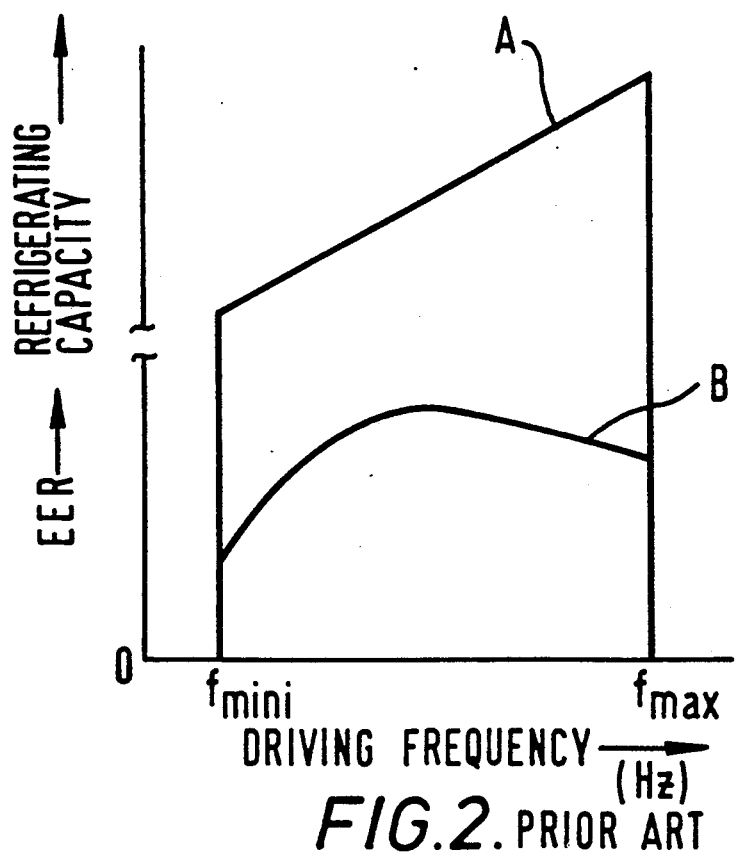
FIG. 2 is a graph illustrating changes of EER and the compressing capacity of a rotary compressor when the driving frequency fed to the rotary compressor varies in the conventional refrigerating circuit shown in FIG. 1.

A connecting point of first and second suction pipes 62 and 74 is fluidly connected to a four-way valve 83. It should be noted that the cylinder displacement of each rotary compressing device 39, 41 is set at a half of that of the conventional single cylinder type rotary compressor shown in FIG. 1. Thus, the air conditioning apparatus includes rotary compressor 31 having the above-described constitution, four-way valve 83, an external heat exchanger 85, a capillary tube 87 (decompression device), and an internal heat exchanger 89 connected in series to construct a heat pump type refrigerating circuit, as shown in FIG. 3. In FIG. 3, other components, such as, e.g., internal and external fan devices, accumulator, etc., are not illustrated for simplicity.

As shown in FIG. 3, an inverter circuit 91 is electrically connected to driving unit 35 to drive rotary compressing unit 37 in response to an air conditioning load. Inverter circuit 91 varies the driving frequency supplied to driving unit 35 in response to changes in air conditioning load. A control circuit 93 includes a microcomputer and its peripheral circuits. Control circuit 93 is electrically connected to inverter circuit 91, and also is connected to open/close value 81 to continuously vary the compressing capacity of rotary compressor 31 by controlling inverter circuit 91 and open/ close value 81. Rotary compressor 31 is maintained at a high side maximum compressing capacity Chmax when the above-described parallel operation is carried out by first and second rotary compressing devices 39 and 41 which are driven at a maximum driving frequency fmax fed from inverter circuit 91. In contrast, rotary compressor 31 is maintained at a low side minimum compressing capacity Clmin when the above-described single operation is carried out by second rotary compressing device 41 which is driven at a minimum driving frequency fmin fed from inverter circuit 91.

Therefore, the compressing capacity of rotary compressor 31 varies between the high side maximum compressing capacity Chmax and the low side minimum compressing capacity Clmin by varying the driving frequency between the maximum driving frequency fmax and the minimum driving frequency fmin and at the same time closing valve 81. A variable capacity range of rotary compressor 31 defined by the high side maximum compressing capacity Chmax and the low side minimum compressing capacity Clmin is divided into two capacity ranges including a variable high capacity side from the high side maximum compressing capacity Chmax to the high side minimum compressing capacity Chmin (a high capacity mode with valve 81 open) and a variable low capacity side from the high side minimum compressing capacity Chmin to the low side minimum compressing capacity Clmin (a low capacity mode with valve 81 closed).

Each capacity mode is set in control circuit 93. In the variable high capacity mode, first and second rotary compressing devices 39 and 41 are driven in parallel, and the compressing capacity of first and second rotary compressing devices 39 and 41 is varied by changing the driving frequency between the maximum driving frequency fmax and the minimum driving frequency fmin. Thus, the compressing capacity of rotary compressor 31 varies within the above-described variable high capacity side. In the variable low capacity mode, open/close valve 81 is closed to interrupt a gaseous fluid flowing into first rotary compressing device 39 so that single operation is established. The compressing capacity of second compressing device 41 is varied by changing the driving frequency between a prescribed driving frequency fmid greater than minimum driving frequency fmin and minimum driving frequency fmin. Thus, the compressing capacity of rotary compressor 31 varies within the above-described variable low capacity side.

When varying the capacity of rotary compressor 31, it should be noted that parallel and single operations of rotary compressor 31 are consecutively carried out while varying the driving frequency fed to driving unit 35 of rotary compressor 31. It should be also noted that control circuit 93 includes a sensor (not shown) for detecting the temperature in a defined space to be conditioned, and thus, a suitable compressing capacity of rotary compressor 31 is selected from each operation mode in response to an output signal of the sensor.

The operation of the above-described air conditioning apparatus will be described hereafter. A heating mode is set in an operation panel (not shown) when a heating operation is carried out. In the heating mode, four-way valve 83 is set to the heating side, and open-/close valve 81 is maintained in its open state by control circuit 93. The maximum driving frequency fmax is fed to driving unit 35 of rotary compressor 31 from inverter circuit 91. Therefore, first and second compressing devices 39 and 41 are driven at a maximum rotation speed (parallel operation). Therefore, rotary compressor 31 operates at the high side maximum compressing capacity Chmax, as shown in FIG. 5. Refrigerant discharged from rotary compressor 31 flows through four-way valve 83, internal heat-exchanger 89 acting as a condenser, capillary tube 87, and external heat-exchanger 85 acting as an evaporator to constitute a heating cycle having a high heating ability. The air conditioning load in the defined space becomes small as the temperature in the defined space increases after the above-described heating operations starts. Thus, the driving frequency fed from inverter circuit 91 to driving unit 35 of rotary compressor 31 is gradually decreased by control circuit 93 through inverter circuit 91 in accordance with the above-described variable capacity mode. Thus, the compressing capacity of rotary compressor 31 gradually decreases, as indicated by a solid line C in FIG. 5. When the driving frequency fed to driving unit 35 decreases to the minimum driving frequency fmin, rotary compressor 31 operates at the high side minimum compressing capacity Chmin, as shown in FIG. 5. At this time, rotary compressor 31 still with first and second compressing devices 39 and 41 operating in parallel can not decrease its compressing capacity from the high side minimum compressing capacity Chmin. However, according to the present invention, open/close valve 81 is closed to interrupt gaseous fluid flowing into first compressing device 39 when the driving frequency decreases to the minimum driving frequency fmin during parallel operation. Thus, rotary compressor 31 changes from parallel operation to single operation wherein second compressing device 41 is driven to compress refrigerant. At the same time, the driving frequency is increased from the minimum driving frequency fmin to the prescribed driving frequency fmid, which is double the minimum driving frequency fmin, as shown in FIG. 5.

Thus, the compressing capacity of rotary compressor 31 can be reduced below the high side minimum compressing capacity Chmin corresponding to the prescribed driving frequency fmid during single operation, and the low side minimum compressing capacity Clmin along a dotted line D shown in FIG. 5 when the driving frequency is changed between the prescribed driving frequency fmid and the minimum driving frequency fmin by control circuit 93 through inverter circuit 91. As can be seen in FIG. 5, the variable range of the compressing capacity of rotary compressor 31 is extended from the high side minimum compressing capacity Chmin to the low side minimum compressing capacity Clmin.

The EER of rotary compressor 31 with respect to frequency also is shown in FIG. 5. The EER of compressor 31 with respect to frequency during parallel operation is the same as that during single operation. However, in FIG. 5, the EER of compressor 31 relative to frequency during parallel operation is indicated by a solid curved line E, and the EER relative to frequency during single operation is indicated by a dotted curved line F for illustration.

In the above-described single operation, since the driving frequency supplied to driving unit 35 of rotary compressor 31 is high (fmin→fmid), the EER of rotary compressor 31 is enhanced by the amount $\Delta EER_1$ compared with that during parallel operation, as shown in FIG. 5.

In the above-described embodiment, the transition between parallel and single operations occurs at the high side minimum compressing capacity Chmin. This minimizes the frequency at which compressor 31 is driven, which has mechanical advantages.

Of course, the transition between parallel and single operations can occur anywhere between the maximum frequency fmax during single operation and the minimum frequency fmin during parallel operation, and even further improvements in efficiency are possible.

The maximum efficiency of compressor 31 occurs at a frequency fm. In another embodiment of this invention, the transition between the parallel and single operations occurs at frequency fm when compressor 31 is operating in the single mode and a corresponding lower frequency producing substantially the same capacity when compressor 31 is operating in the parallel mode. As a result, the EER of rotary compressor 31 is further enhanced by the amount of $\Delta EER_2$ greater than the amount of $\Delta EER_1$ even though the compressing capacity Clm remains the same during the transition between parallel and single operations. Therefore, the EER of rotary compressor 31 can be greatly improved.

With the above-described embodiments, since parallel operation, wherein first and second compressing devices 39 and 41 of rotary compressor 31 are operated in parallel, and the single operation, wherein either first or second compressing device 39 or 41 is operated by a relatively high driving frequency compared with parallel operation, are successively carried out, the EER of rotary compressor 31 can be enhanced even though the driving frequency decreases, as shown in FIG. 6. In FIG. 6, the EER of rotary compressor 31 driven during single operation is indicated by a dotted line, and the EER of rotary compressor 31 during parallel operation is indicated by a solid line. Furthermore, the capacity range of rotary compressor 31 may be extended toward a lower compressing capacity. Since compressing unit 37 is divided into first compressing device 39 and second compressing device 41, vibrations of compressing unit 37 may be reduced.

In the above-described embodiment, the displacement of the cylinder of first compressing device 39 is set to be similar to that of second compressing device 41. However, the displacement of first compressing device 39 may be different from that of second compressing device 41.

Many changes and modifications in the above-described embodiment can be carried out without departing from the scope of the invention. Therefore, appended claims should be construed to include all such modifications.

What is claimed is:

1. A compressing apparatus comprising:

first compressing means for compressing refrigerant;

second compressing means, coupled with the first compressing means, for compressing refrigerant;

means for variably driving the first and second compressing means, the driving means including a variable rotation motor mechanically connected to the first and second compressing means and inverter means for varying the driving frequency supplied to the motor within prescribed driving frequency range defined by a minimum driving frequency and a maximum driving frequency higher than the minimum driving frequency;

means for selecting one of a parallel operation state wherein both the first and second compressing means compress and a single operation state wherein one of the first and second compressing means compresses; and means for controlling the selecting means and the inverter means for increasing the driving frequency supplied to the motor to a value which increases an energy efficiency ratio of the compressing apparatus when the operation state of the first and second compressing means is changed from the parallel operation state to the single operation state, wherein when said compressing apparatus is changed from the parallel operation state to the single operation state, the driving frequency changes from the minimum frequency to a mid-frequency, said mid-frequency being significantly less than the maximum driving frequency but greater than said minimum driving frequency, and a capacity of the compressing apparatus remains constant when the state of the apparatus is changed from the parallel to the single operation state and once the apparatus is in the single operation state the driving frequency of the apparatus in the single state can then decrease to the minimum frequency where the capacity of the apparatus is a minimum.

2. An apparatus according to claim 1 wherein the control means includes means for extending the lower side compressing capacity of the compressing apparatus by selecting the single operation state during low compressing load.

3. An apparatus according to claim 2, wherein the control means includes means for sequentially causing the selecting means to select the parallel operation state and the single operation state for successively varying a compressing capacity of the compressing apparatus.

4. An apparatus according to claim 2, wherein the control means includes means for causing the selecting means to change the operation state of the first and second compressing means from the parallel operation state to the single operation state so that the single operation state is selected for compressing capacities that would necessitate the driving frequency supplied to the motor to be below the minimum driving frequency of the driving means if the selecting means were to select the parallel operation state.

5. An apparatus according to claim 1, wherein the selecting means includes valve means for interrupting a gaseous fluid flowing into one of the first and second compressing means to cause a change from the parallel operation state to the single operation state.

6. A variable capacity compressing apparatus comprising:

a casing having an outer wall for defining an inside space, the casing including an output port and first and second intake ports formed in the outer wall thereof;

a variable rotation driving unit disposed in the casing, the driving unit having a rotation shaft;

a first rotary compressing device arranged in the casing, the first rotary compressing device having an eccentric rotation roller mechanically connected to the rotation shaft of the driving unit, the first rotary compressing device also having a first output opening communicating with the output port of the casing through the inside space of the casing, and a first intake opening directly communicating with the first intake port of the casing;

a second rotary compressing device mounted on the first compressing device, the second rotary compressing device having an eccentric rotation roller mechanically connected to the eccentric rotation roller of the first rotary compressing device, the second rotary compressing device also having a second output opening communicating with the output port of the casing through the inside space of the casing, and a second intake opening directly communicating with the second intake port of the casing;

an open/close valve communicating with one of the first and second intake ports of the casing for interrupting a gaseous fluid flowing into one of the first and second rotary compressing devices communicating with one of the first and second intake ports of the casing, respectively;

inverter means for varying the driving frequency supplied to the variable rotation driving unit within a prescribed driving frequency range defined by a minimum driving frequency and a maximum driving frequency; and a control device for controlling the inverter means and the open/close valve for alternately selecting the operation state of the first and second rotary compressing devices for a parallel operation state wherein the open/close valve is open and a single operation state wherein the open/close valve is closed, the control device including means for increasing the driving frequency supplied from the inverter means to the variable rotation driving unit to a value which increases an energy efficiency ratio of the compressing apparatus when the operation state of the first and second rotary compressing devices is changed from the parallel operation state to the single operation state, wherein when said compressing apparatus is changed from the parallel operation state to the single operation state, the driving frequency changes from the minimum frequency to a mid-frequency, said mid-frequency being significantly less than the maximum driving frequency but greater than said minimum driving frequency, and a capacity of the compressing apparatus remains constant when the state of the apparatus is changed from the parallel to the single operation state and once the apparatus is in the single operation state the driving frequency of the apparatus in the single state can then decrease to the minimum frequency where the capacity of the apparatus is a minimum.

* * * * *